(12) United States Patent
Chaudhri et al.

(10) Patent No.: US 12,230,029 B2
(45) Date of Patent: Feb. 18, 2025

(54) WEARABLE MULTIMEDIA DEVICE AND CLOUD COMPUTING PLATFORM WITH LASER PROJECTION SYSTEM

(71) Applicant: Humane, Inc., San Francisco, CA (US)

(72) Inventors: Imran A. Chaudhri, San Francisco, CA (US); Patrick Gates, San Francisco, CA (US); Monique Relova, South San Francisco, CA (US); Bethany Bongiorno, San Francisco, CA (US); Brian Huppi, San Francisco, CA (US); Shahzad Chaudhri, Arlington, VA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 16/904,544

(22) Filed: Jun. 17, 2020

(65) Prior Publication Data
US 2021/0117680 A1 Apr. 22, 2021

Related U.S. Application Data

(63) Continuation-in-part of application No. 15/976,632, filed on May 10, 2018, now Pat. No. 10,924,651.
(Continued)

(51) Int. Cl.
*G06V 20/20* (2022.01)
*G06F 3/01* (2006.01)
*H04N 7/18* (2006.01)

(52) U.S. Cl.
CPC .............. *G06V 20/20* (2022.01); *G06F 3/017* (2013.01); *H04N 7/18* (2013.01)

(58) Field of Classification Search
CPC .......................... G06K 9/00671; G06F 3/017
See application file for complete search history.

(56) References Cited

U.S. PATENT DOCUMENTS 9,355,356 B2 5/2016 Weast et al.
9,794,475 B1 10/2017 Tome et al.
(Continued)

FOREIGN PATENT DOCUMENTS

CN 103907357 7/2014
CN 104969205 10/2015
(Continued)

OTHER PUBLICATIONS

EP Extended European Search Report in European Appln. No. 18798577, dated Feb. 17, 2021, 10 pages.
(Continued)

*Primary Examiner* — Shivang I Patel
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a body-worn apparatus comprises: a camera; a depth sensor; a laser projection system; one or more processors; memory storing instructions that when executed by the one or more processors, cause the one or more processors to perform operations comprising: capturing, using the camera, a set of digital images; identifying an object in the set of digital images; capturing, using the depth sensor, depth data; identifying a gesture of a user wearing the apparatus in the depth data; associating the object with the gesture; obtaining data associated with the object; and projecting, using the laser projection system, a laser projection of the data on a surface.

17 Claims, 15 Drawing Sheets

Related U.S. Application Data

(60) Provisional application No. 62/863,222, filed on Jun. 18, 2019, provisional application No. 62/504,488, filed on May 10, 2017.

(56) References Cited

U.S. PATENT DOCUMENTS

| | | | |
|---|---|---|---|
| 10,924,651 | B2 | 2/2021 | Chaudhri et al. |
| 11,652,965 | B2 | 5/2023 | Meier et al. |
| 2002/0083025 | A1 | 6/2002 | Robarts et al. |
| 2002/0085843 | A1 | 7/2002 | Mann |
| 2008/0095468 | A1* | 4/2008 | Klemmer ............ H04N 9/3147 382/285 |
| 2009/0238538 | A1 | 9/2009 | Fink et al. |
| 2010/0199232 | A1 | 8/2010 | Mistry et al. |
| 2012/0035934 | A1* | 2/2012 | Cunningham .......... G06F 3/165 704/260 |
| 2012/0041675 | A1 | 2/2012 | Juliver et al. |
| 2012/0245944 | A1 | 9/2012 | Gruber et al. |
| 2014/0253743 | A1 | 9/2014 | Lozam et al. |
| 2014/0281975 | A1 | 9/2014 | Anderson et al. |
| 2014/0337243 | A1 | 11/2014 | Dutt et al. |
| 2015/0029223 | A1 | 1/2015 | Kaino et al. |
| 2015/0181272 | A1 | 6/2015 | Lu et al. |
| 2015/0229750 | A1* | 8/2015 | Zhou ................. H04M 1/72412 455/552.1 |
| 2015/0237300 | A1 | 8/2015 | Mendis et al. |
| 2015/0324181 | A1 | 11/2015 | Segal |
| 2015/0338926 | A1 | 11/2015 | Park et al. |
| 2015/0371215 | A1 | 12/2015 | Zhou et al. |
| 2016/0026423 | A1 | 1/2016 | Zenoff |
| 2016/0189051 | A1 | 6/2016 | Mahmood |
| 2016/0261834 | A1* | 9/2016 | Li .......................... G06F 3/042 |
| 2016/0335506 | A1 | 11/2016 | Renkis |
| 2016/0377722 | A1* | 12/2016 | Lardin .................... G01S 17/42 356/5.12 |
| 2017/0123487 | A1* | 5/2017 | Hazra ..................... G06F 3/017 |
| 2017/0206899 | A1 | 7/2017 | Bryant et al. |
| 2017/0315519 | A1* | 11/2017 | Laurent ................. G06F 3/038 |
| 2017/0323481 | A1* | 11/2017 | Tran .................. H04N 5/23219 |
| 2018/0075658 | A1 | 3/2018 | Lanier et al. |
| 2018/0276899 | A1 | 9/2018 | Liao et al. |
| 2018/0332211 | A1* | 11/2018 | Chaudhri ................ H04L 67/20 |
| 2022/0011855 | A1 | 1/2022 | Hazra et al. |
| 2022/0038615 | A1 | 2/2022 | Chaudhri et al. |
| 2023/0239567 | A1 | 7/2023 | Chaudhri et al. |
| 2023/0417538 | A1 | 12/2023 | Tsurumi |

FOREIGN PATENT DOCUMENTS

| | | |
|---|---|---|
| CN | 105556506 | 5/2016 |
| CN | 105027562 | 2/2019 |
| EP | 3366516 | 8/2018 |
| JP | 2002-133588 | 5/2002 |
| JP | 2009-239466 | 10/2009 |
| JP | 2011-239141 | 11/2011 |
| JP | 2012-221498 | 11/2012 |
| JP | 2013-083985 | 5/2013 |
| JP | 2013-521576 | 6/2013 |
| JP | 2014-132478 | 7/2014 |
| JP | 2016-148968 | 8/2016 |
| JP | 2016-178662 | 10/2016 |
| JP | 2017-016056 | 1/2017 |
| JP | 2017-120329 | 7/2017 |
| JP | 2018-028922 | 2/2018 |
| JP | 2018-180840 | 11/2018 |
| JP | 2019-032495 | 2/2019 |
| KR | 10-2018-0088390 | 8/2018 |
| WO | WO 2014/071254 | 5/2014 |
| WO | WO 2015/127383 | 8/2015 |
| WO | WO 2017/035384 | 3/2017 |
| WO | WO 2017/134886 | 8/2017 |

OTHER PUBLICATIONS

Krishnamoorthy et al., "Generating natural-language video descriptions using text-mined knowledge," Proceedings of the Twenty-Seventh AAAI Conference on Artificial Intelligence, Jul. 2013, 7 pages.

Searcherp.Techtarget.com [online], "Financial Application," Mar. 2012, retrieved on Feb. 25, 2021, retrieved from URL <https://searcherp.techtarget.com/definition/financial-application>, 4 pages.

PCT International Search Report and Written Opinion in International Appln. No. PCT/US2020/38505, dated Sep. 16, 2020, 13 pages.

International Preliminary Report on Patentability in International Appln. No. PCT/US2020/038505, dated Dec. 30, 2022, 11 pages.

Blais et al., "3D imaging from theory to practice: the Mona Lisa story." Current Developments in Lens Design and Optical Engineering IX, Aug. 2008, 7060:126-135.

Extended European Search Report in European Appln. No. 20826684.1, mailed on Jun. 6, 2023, 12 pages.

Xiao et al., "LumiWatch On-Arm Projected Graphics and Touch Input", Proceedings of the 33rd ACM/IEEE International Conference on Automated Software Engineering, Acmpub27, New York, NY, USA, Apr. 2018, 11 pages.

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE International Symposium on Wearable Computing, 2000, 4 pages.

Mann, "Wearable Computing: a First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of CHI EA '09 Extended Abstracts on Human Factors in Computing Systems, ACM New York, NY, USA, 5 pages.

Shetty et al., "Sixth Sense Technology," International Journal of Science and Research, Dec. 2014, 3(12):1068-1073.

\* cited by examiner

WEARABLE MULTIMEDIA DEVICE AND CLOUD COMPUTING PLATFORM WITH LASER PROJECTION SYSTEM

CROSS-REFERENCE TO RELATED APPLICATIONS

This application claims the benefit of priority from U.S. Provisional Patent Application No. 62/863,222, for "Wearable Multimedia Device and Cloud Computing Platform With Application Ecosystem," filed Jun. 18, 2019, and is a continuation-in-part of U.S. patent application Ser. No. 15/976,632, for "Wearable Multimedia Device and Cloud Computing Platform With Application Ecosystem," filed May 10, 2018, which claims priority to U.S. Provisional Patent Application No. 62/504,488, filed May 10, 2017, wherein each of these patent applications is incorporated by reference herein in its entirety.

TECHNICAL FIELD

This disclosure relates generally to cloud computing and multimedia editing.

BACKGROUND

Modern mobile devices (e.g., smart phones, tablet computers) often include an embedded camera that allows a user to take digital images or videos of spontaneous events. These digital images and video can be stored in an online database associated with a user account to free up memory on the mobile device. Users can share their images and videos with friends and family, and download or stream the images and videos on demand using their various playback devices. These embedded cameras provide significant advantages over conventional digital cameras, which are bulky and often require more time to set-up a shot.

Despite the convenience of mobile device embedded cameras, there are many important moments that are not captured by these devices because the moments occur too quickly or the user simply forgets to take an image or video because they are emotionally caught up in the moment.

SUMMARY

Systems, methods, devices and non-transitory, computer-readable storage mediums are disclosed for a wearable multimedia device and cloud computing platform with an application ecosystem for processing multimedia data captured by the wearable multimedia device.

In an embodiment, a body-worn apparatus comprises: a camera; a depth sensor; a laser projection system; one or more processors; memory storing instructions that when executed by the one or more processors, cause the one or more processors to perform operations comprising: capturing, using the camera, a set of digital images; identifying an object in the set of digital images; capturing, using the depth sensor, depth data; identifying a gesture of a user wearing the apparatus in the depth data; associating the object with the gesture; obtaining data associated with the object; and projecting, using the laser projection system, a laser projection of the data on a surface.

In an embodiment, the laser projection includes a text label for the object.

In an embodiment, the laser projection includes a size template for the object.

In an embodiment, the laser projection includes instructions for performing an action on the object.

In an embodiment, a body-worn apparatus comprises: a camera; a depth sensor; a laser projection system; one or more processors; memory storing instructions that when executed by the one or more processors, cause the one or more processors to perform operations comprising: capturing, using the sensor, depth data; identifying a first gesture in the depth data, the gesture made by a user wearing the apparatus; associating the first gesture with a request or command; and projecting, using the laser projection system, a laser projection on a surface, the laser projection associated with the request or command.

In an embodiment, the operations further comprise: obtaining, using the depth sensor, a second gesture associated with the laser projection; determining user input based on the second gesture; and initiating one or more actions in accordance with the user input.

In an embodiment, the operations further comprise: masking the laser projection to prevent projecting the data on a hand of the user making the second gesture.

In an embodiment, the operations further comprise: obtaining, using the depth sensor or camera, depth or image data indicative of a geometry, material or texture of the surface; and adjusting one or more parameters of the laser projection system based on the geometry, material or texture of the surface.

In an embodiment, the operations further comprise: capturing, using the camera, reflections of the laser projection from the surface; automatically adjusting an intensity of the laser projection to compensate for different indexes of refraction so that the laser projection has a uniform brightness.

In an embodiment, the apparatus includes: a magnetic attachment mechanism configured to magnetically couple to a battery pack through a user's clothing, where the magnetic attachment mechanism further configured to receive inductive charging from the battery back.

In an embodiment, a method comprises: capturing, using a depth sensor of a body-worn apparatus, depth data; identifying, using one or more processors of the apparatus, a first gesture in the depth data, the first gesture made by a user wearing the apparatus; associating, using the one or more processors, the first gesture with a request or command; and projecting, using a laser projection system of the apparatus, a laser projection on a surface, the laser projection associated with the request or command.

In an embodiment, the method further comprises: obtaining, using the depth sensor, a second gesture by the user, the second gesture associated with the laser projection; determining user input based on the second gesture; and initiating one or more actions in accordance with the user input.

In an embodiment, the one or more actions include controlling another device.

In an embodiment, the method further comprises masking the laser projection to prevent projecting the data on a hand of the user making the second gesture.

In an embodiment, the method further comprises obtaining, using the depth sensor or camera, depth or image data indicative of a geometry, material or texture of the surface; and adjusting one or more parameters of the laser projection system based on the geometry, material or texture of the surface.

In an embodiment, a method comprises: receiving, by one or more processors of a cloud computing platform, context data from a wearable multimedia device, the wearable multimedia device including at least one data capture device for capturing the context data; creating, by the one or more processors, a data processing pipeline with one or more applications based on one or more characteristics of the context data and a user request; processing, by the one or more processors, the context data through the data processing pipeline; and sending, by the one or more processors, output of the data processing pipeline to the wearable multimedia device or other device for presentation of the output.

In an embodiment, a system comprises: one or more processors; memory storing instructions that when executed by the one or more processors, causes the one or more processors to perform operations comprising: receiving, by one or more processors of a cloud computing platform, context data from a wearable multimedia device, the wearable multimedia device including at least one data capture device for capturing the context data; creating, by the one or more processors, a data processing pipeline with one or more applications based on one or more characteristics of the context data and a user request; processing, by the one or more processors, the context data through the data processing pipeline; and sending, by the one or more processors, output of the data processing pipeline to the wearable multimedia device or other device for presentation of the output.

In an embodiment, a non-transitory, computer-readable storage medium comprises instructions for: receiving, by one or more processors of a cloud computing platform, context data from a wearable multimedia device, the wearable multimedia device including at least one data capture device for capturing the context data; creating, by the one or more processors, a data processing pipeline with one or more applications based on one or more characteristics of the context data and a user request; processing, by the one or more processors, the context data through the data processing pipeline; and sending, by the one or more processors, output of the data processing pipeline to the wearable multimedia device or other device for presentation of the output.

In an embodiment, a method comprises: receiving, by a controller of a wearable multimedia device, depth or image data indicative of a surface geometry, material or texture, the depth or image data provided by one or more sensors of the wearable multimedia device; adjusting, by the controller, one or more parameters of a projector of the wearable multimedia device based on the surface geometry, material or texture; projecting, by a projector of the wearable multimedia device, text or image data onto the surface; receiving, by the controller, depth or image data from the one or more sensors indicative of a user interaction with the text or image data projected on the surface; determining, by the controller, user input based on the user interaction; and initiating, by a processor of the wearable multimedia device, one or more actions in accordance with the user input.

In an embodiment, a wearable multimedia device, comprising: one or more sensors; a projector; a controller configured to: receive depth or image data from the one or more sensors, the depth or image data indicative of a surface geometry, material or texture, the depth or image data provided by one or more sensors of the wearable multimedia device; adjust one or more parameters of the projector based on the surface geometry, material or texture; project using the projector text or image data onto the surface; receive depth or image data from the one or more sensors indicative of a user interaction with the text or image data projected on the surface; determine user input based on the user interaction; and initiate one or more actions in accordance with the user input.

Particular embodiments disclosed herein provide one or more of the following advantages. A wearable multimedia device captures multimedia data of spontaneous moments and transactions with minimal interaction by the user. The multimedia data is automatically edited and formatted on a cloud computing platform based on user preferences, and then made available to the user for replay on a variety of user playback devices. In an embodiment, the data editing and/or processing is performed by an ecosystem of applications that are proprietary and/or provided/licensed from third party developers. The application ecosystem provides various access points (e.g., a website, portal, API) that allow the third party developers to upload, verify and update their applications. The cloud computing platform automatically builds a custom processing pipeline for each multimedia data stream using one or more of the ecosystem applications, user preferences and other information (e.g., the type or format of the data, the quantity and quality of the data).

Additionally, the wearable multimedia device includes a camera and depth sensor that can detect objects and user air gestures, and then perform or infer various actions based on the detections, such a labeling objects in camera images or controlling other devices. In an embodiment, the wearable multimedia device does not include a display, allowing the user to continue interacting with friends, family and co-workers without being immersed in a display, as is the current problem with smart phone and tablet computer users. As such, the wearable multimedia device takes a different technical approach than, for example, smart goggles or glasses for augmented reality (AR) and virtual reality (VR), where the user is further detached from the real-world environment. To facilitate collaboration with others and to compensate for no display, the wearable multimedia computer includes a laser projection system that projects a laser projection onto any surface, including tables, walls and even the user's palm. The laser projection can label objects, provide text or instructions related to the objects and provide an ephemeral user interface (e.g., a keyboard, numeric key pad, device controller) that allows the user to compose messages, control other devices, or simply share and discuss content with others.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Overview

Figure 1:
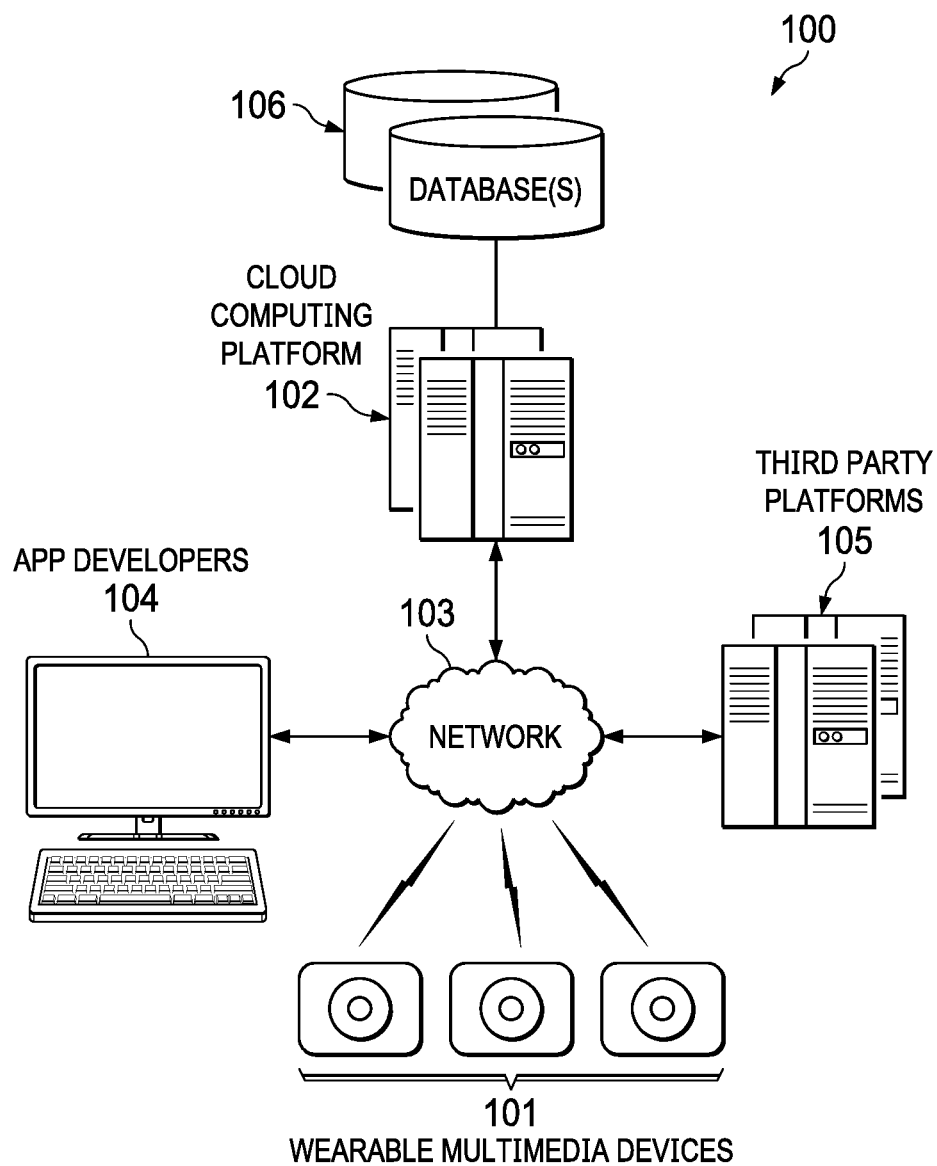
FIG. 1 is a block diagram of an operating environment for a wearable multimedia device and cloud computing platform with an application ecosystem for processing multimedia data captured by the wearable multimedia device, according to an embodiment

A wearable multimedia device is a lightweight, small form factor, battery-powered device that can be attached to a user's clothing or an object using a tension clasp, interlocking pin back, magnet or any other attachment mechanism. The wearable multimedia device includes a digital image capture device (e.g., 180° FOV with optical image stabilizer (OIS)) that allows a user to spontaneously capture multimedia data (e.g., video, audio, depth data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top. In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and sent to the cloud computing platform where an image recognition application can run an image query and store or return the results to the user. Air and touch gestures can also be performed on a projected ephemeral display, for example, responding to user interface elements.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allow various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing. In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

Example Operating Environment

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., 180° FOV with OIS) that allows a user to spontaneously capture multimedia data (e.g., video, audio, depth data) of "moments" and documenting every day transactions (e.g., financial transactions) with minimal user interaction or device set-up. The context data captured by wireless multimedia devices 101 are uploaded to cloud computing platform 102. Cloud computing platform 101 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes 180° FOV that allows the camera to capture almost everything that the user is currently seeing. The user can start recording by simply tapping the surface of the device or pressing a button. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
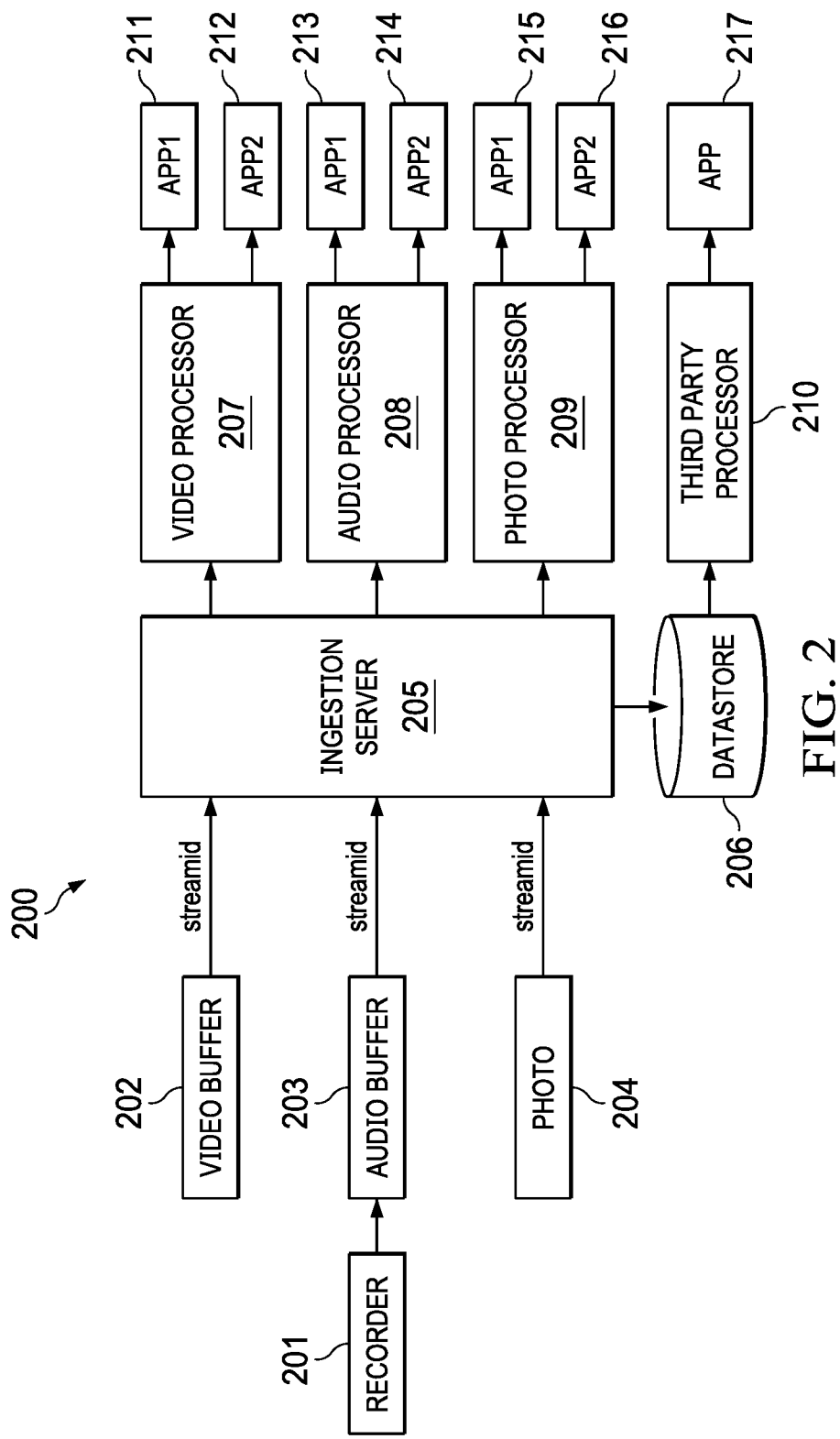
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
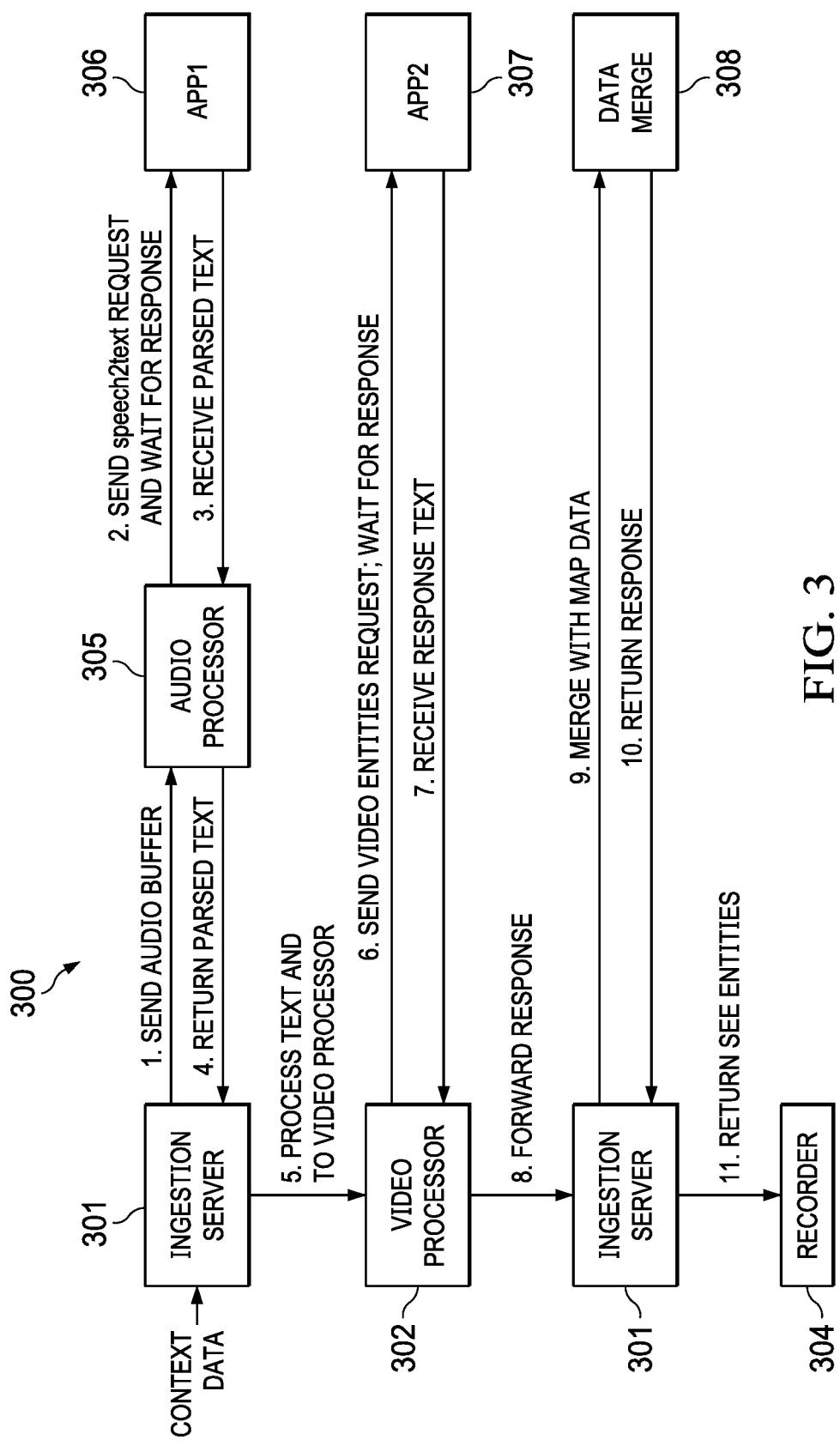
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a requests to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
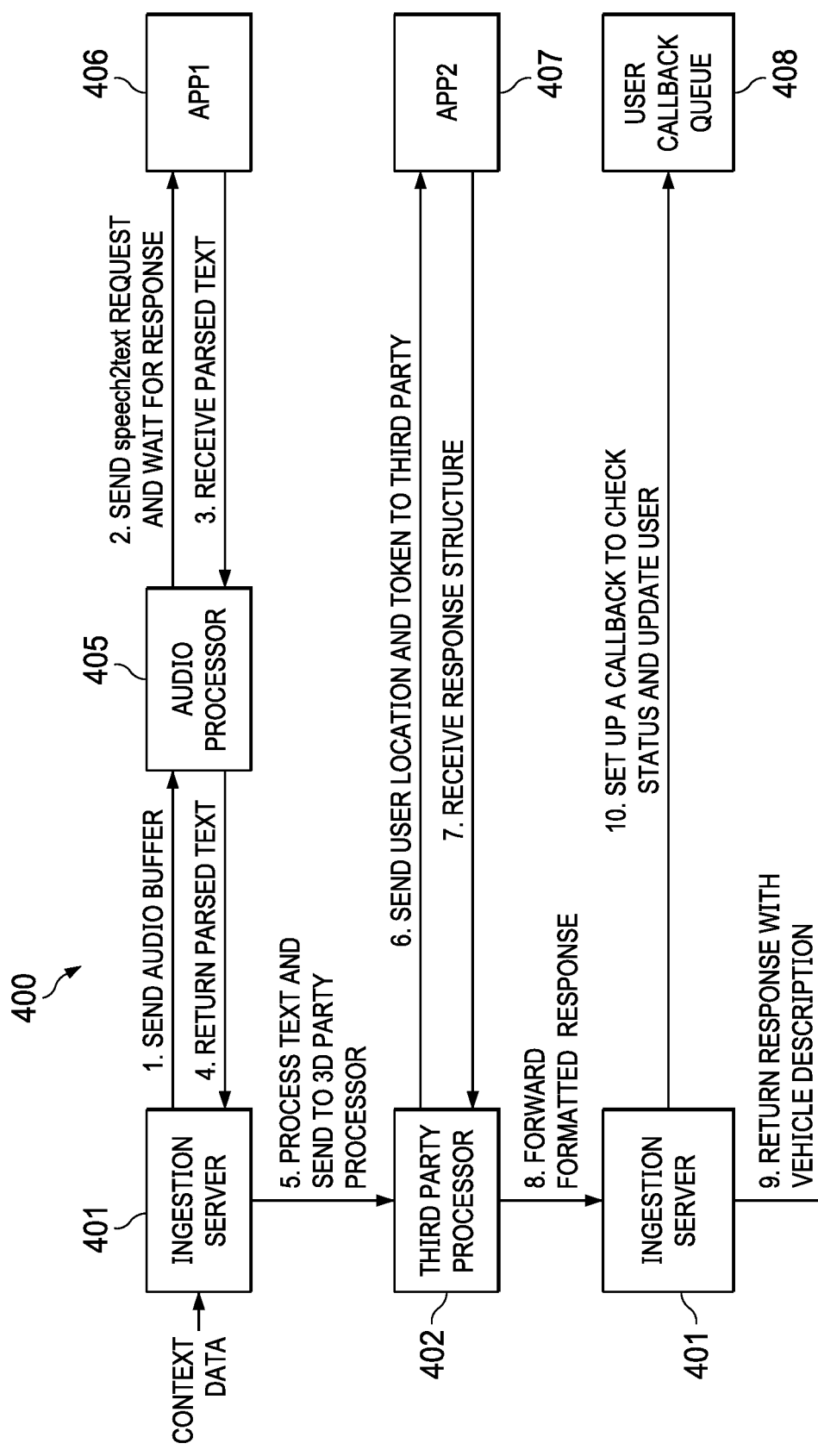
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™®) application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

Figure 5:
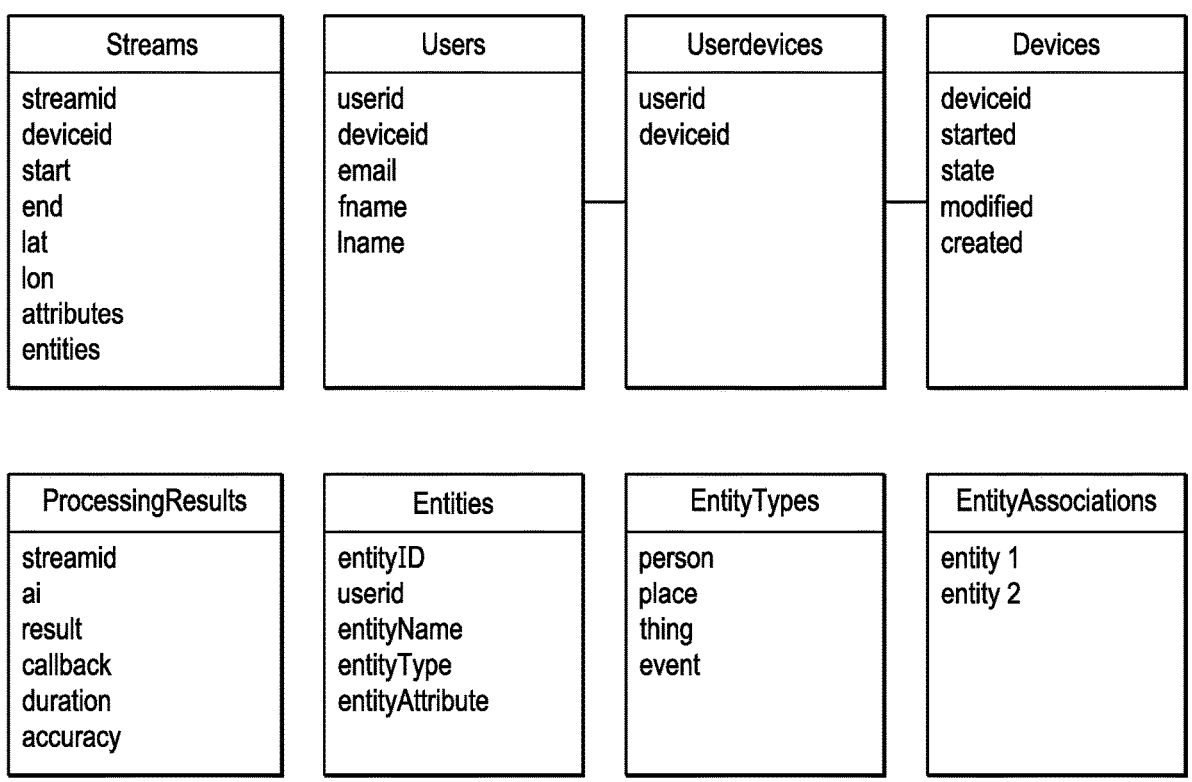
FIG. 5 illustrates data objects used by the data processing system of FIG. 2, according to an embodiment.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
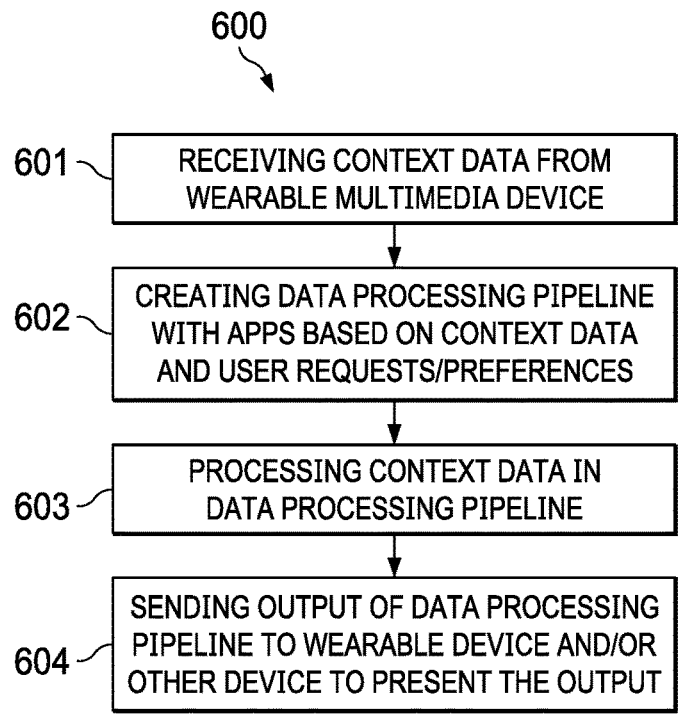
FIG. 6 is flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
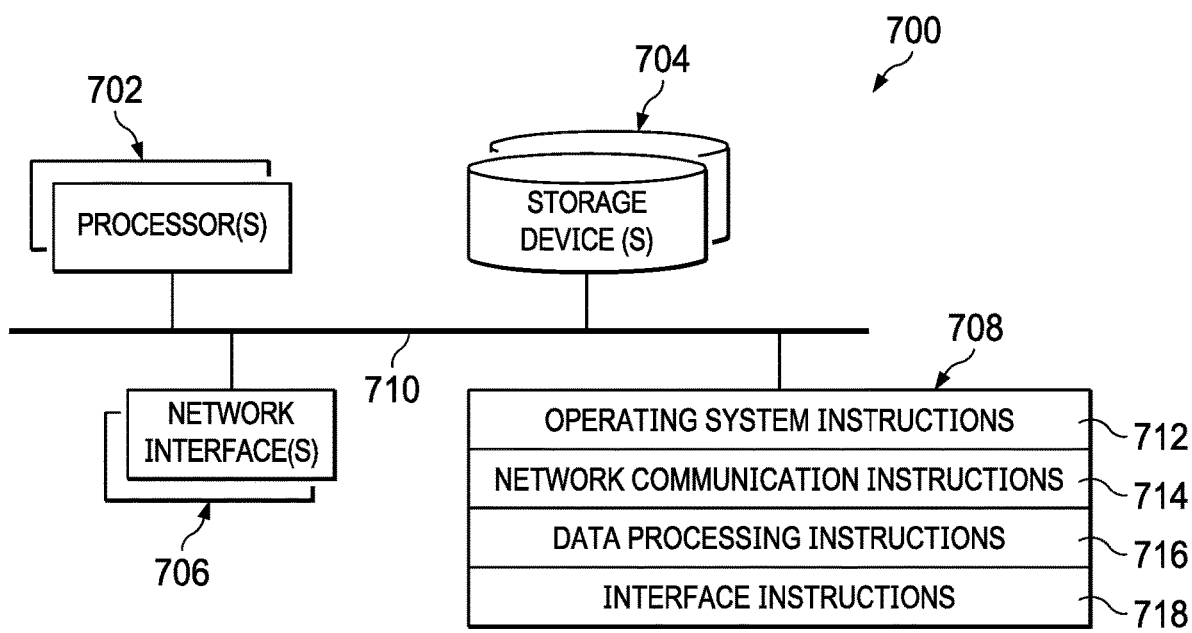
FIG. 7 is an architecture for the cloud computing platform, according to an embodiment.

FIG. 7 is an example architecture 700 for cloud computing platform 102 described in reference to FIGS. 1-6 and 9, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
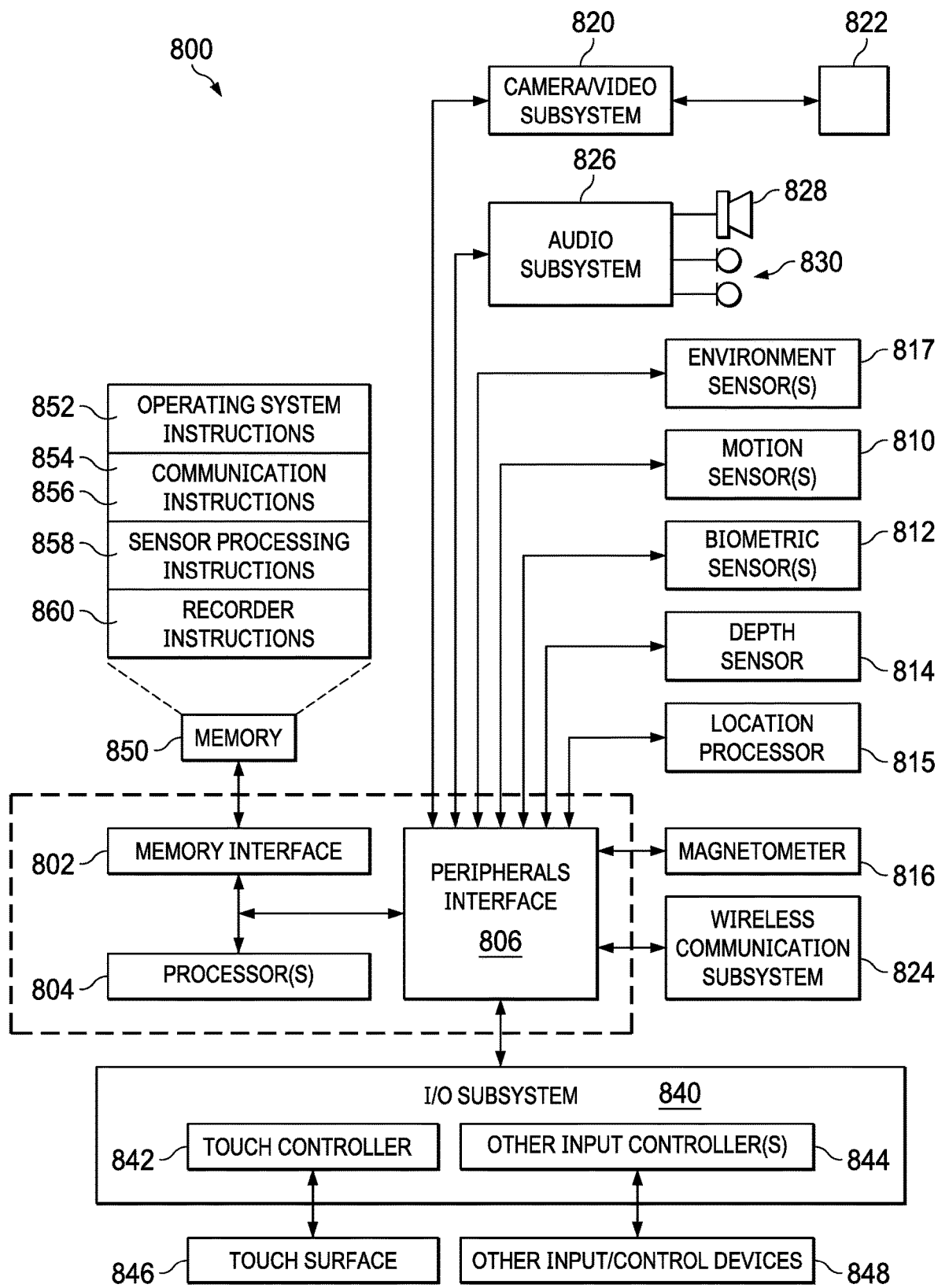
FIG. 8 is an architecture for the wearable multimedia device, according to an embodiment.

FIG. 8 is a block diagram of example architecture 800 for a wearable multimedia device implementing the features and processes described in reference to FIGS. 1-6 and 9. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, depth sensor 814 may be coupled to peripherals interface 806 to facilitate motion, orientation, biometric and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, device 800 plays back to a user recorded audio and/or video files, such as MP3, AAC, and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Example Graphical User Interface

Figure 9:
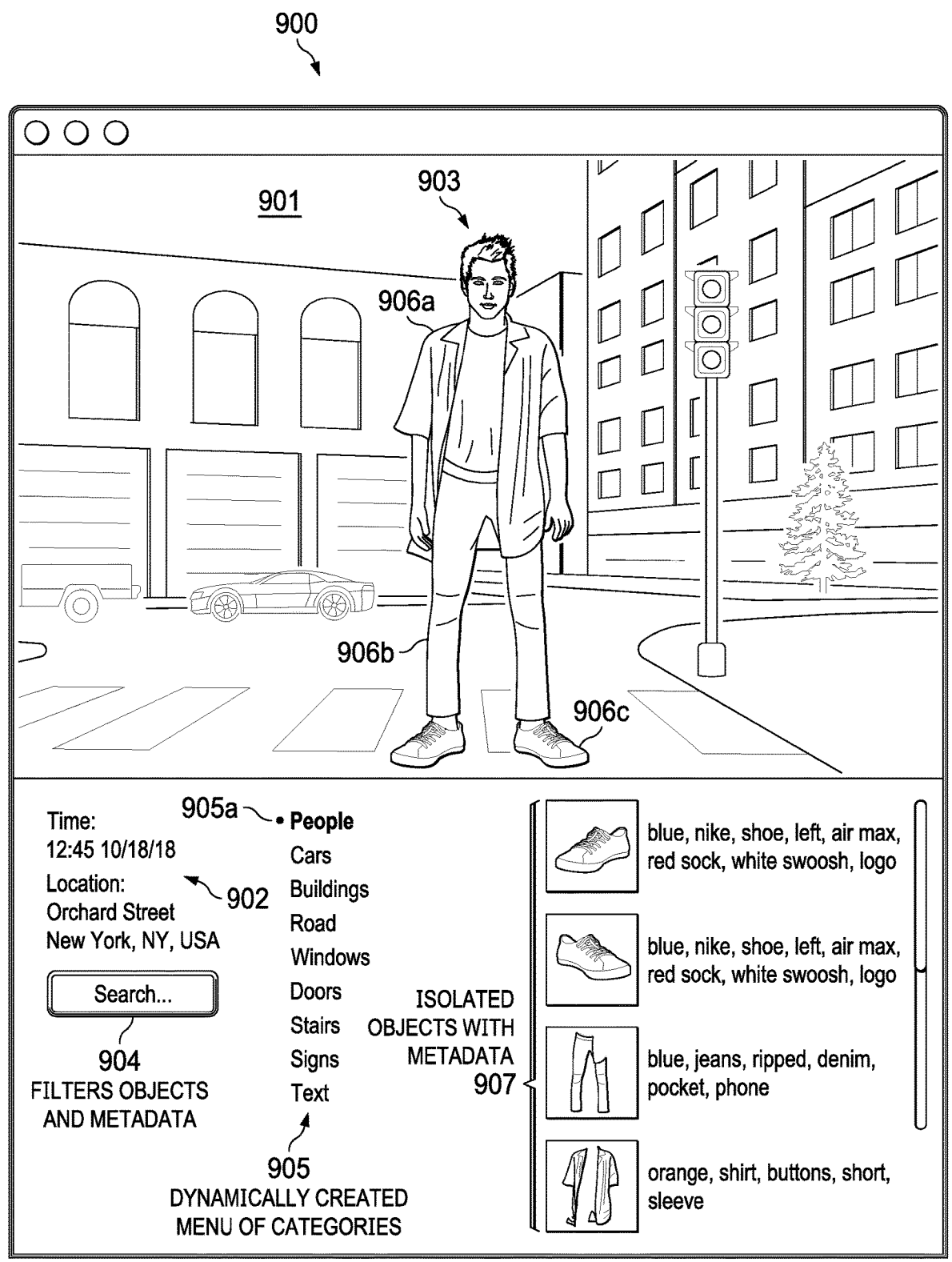
FIG. 9 is a screen shot of an example graphical user interface (GUI) for the scene identification application described in reference to FIG. 3, according to an embodiment.

FIG. 9 is a screen shot of an example graphical user interface (GUI) 900 for use with the scene identification application described in reference to FIG. 3, according to an embodiment. GUI 900 includes video pane 901, time/location data 902, objects 903, 906a, 906b, 906c, search button 904, menu of categories 905 and thumbnail images 907. GUI 900 can be presented on a user device (e.g., a smartphone, tablet computer, wearable device, desktop computer, notebook computer) through, for example, a client application or through web page provided by a web server of cloud computing platform 102. In this example, a user has captured an digital image of a young man in video pane 901 standing on Orchard Street, New York, N.Y. on Oct. 18, 2018 at 12:45 PM, as indicated by time/location data 902.

In an embodiment, the image is processed through an object detection framework implemented on cloud computing platform 102, such as the Viola-Jones object detection network. For example, a model or algorithm is used to generate regions of interest or region proposals that include a set of bounding boxes that span the full digital image. Visual features are extracted for each of the bounding boxes and evaluated to determine whether and which objects are present in the region proposals based on visual features. Overlapping boxes are combined into a single bounding box (e.g., using non-maximum suppression). In an embodiment, overlapping boxes are also used to organize objects into categories in big data storage. For example, object 903 (the young man) is considered a parent object and objects 906a-906c (the articles of clothing he is wearing) are considered child objects (shoes, shirt, pants) to object 903 due to overlapping bounding boxes. Thus, a search on "people" using a search engine results in all objects labeled as "people" and their child objects, if any, being included in the search results.

In an embodiment, rather than bounding boxes complex polygons are used to identify objects in an image. The complex polygon is used to determine the highlight/hotspot region in the image where, for example, the user is pointing. Because only a complex poly segmentation piece is sent to the cloud computing platform (rather than the whole image), privacy, security and speed are improved.

Other examples of object detection frameworks that can be implemented by cloud computing platform 102 to detect and label objects in a digital image include but are not limited to: region convolutional neural networks (R-CNN), Fast R-CNN and Faster R-CNN.

In this example, the objects identified in the digital image include people, cars, buildings, road, windows, doors, stairs signs text. The identified objects are organized and presented as categories for the user to search. The user has selected the category "People" using a cursor or finger (if using a touch sensitive screen). By selecting the category "People," the object 903 (i.e., the young man in the image) is isolated from the rest of the objects of the digital image, and a subset of objects 906a-906c are displayed in thumbnail images 907 with their respective metadata. Object 906a is a labeled as "orange, shirt, buttons, short sleeve." object 906b is labeled as "blue, jeans, ripped, denim, pocket, phone," and object 906c is labeled as "blue, Nike, shoe, left, air max, red sock, white swoosh, log."

Search button 904 when pressed initiates a new search based on the category selected by the user and the particular image in the video pane 901. The search results include thumbnail images 907. Similarly, if the user selects the category "Cars" and then presses search button 904, a new set of thumbnails 907 are displayed showing all the cars captured in the image together with their respective metadata.

Figures 10, 13:
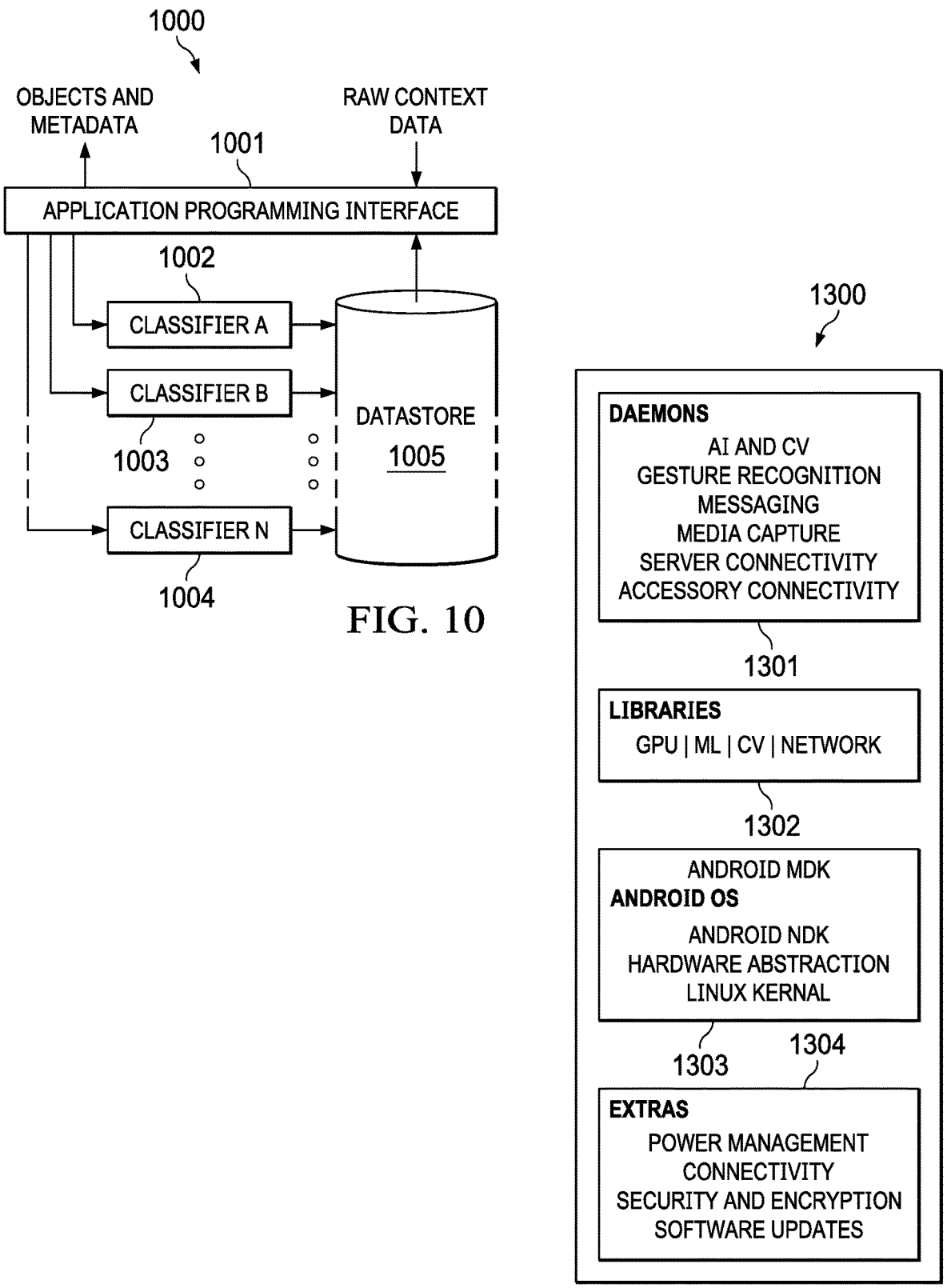
FIG. 10 illustrates a classifier framework for classifying raw or preprocessed context data into objects and metadata that can be searched using the GUI of FIG. 9, according to an embodiment.
FIG. 13 illustrates software components for the wearable multimedia device, according to an embodiment.

FIG. 10 illustrates a classifier framework 1000 for classifying raw or preprocessed context data into objects and metadata that can be searched using the GUI 900 of FIG. 9, according to an embodiment. Framework 1000 includes API 1001, classifiers 1002a-1002n and datastore 1005. Raw or preprocessed context data captured on the wearable multimedia device is uploaded through API 1001. The context data is run through classifiers 1002a-1002n (e.g., neural networks). In an embodiment, classifiers 1002a-1002n are trained using context data crowd-sourced from a large number of wearable multimedia devices. Outputs of classifiers 1002a-1002n are objects and metadata (e.g., labels) which are stored in datastore 1005. A search index is generated for the objects/metadata in datastore 1005 which can be used by a search engine to search for objects/metadata that satisfy a search query entered using GUI 900. Various types of search indexes can be used, including but not limited to: tree index, suffix tree index, inverted index, citation index analysis and an n-gram index.

Classifiers 1002a-1002n are selected and added into a dynamic data processing pipeline based on one or more of the data type, data quantity, data quality, user preferences, user initiated or application initiated search queries, speech commands, application(s) requirements, templates and/or any other information to generate a desired presentation. Any known classifier can be used, including neural networks, Support Vector Machines (SVMs), Random Forests, Boosted Decision Trees, and any combination of these individual classifiers using voting, stacking and grading techniques. In an embodiment, some of the classifiers are personal to the user, i.e., the classifier is trained only on context data from a specific user device. Such classifiers can be trained to detect and label people and objects that are personal to the user. For example, one classifier can be used for face detection to detect faces in images of individuals known to the user (e.g., family members, friends) and that have been labeled by, for example, user input.

By way of example, a user can speak multiple phrases, such as: "create a movie from my videos that includes my mom and dad in New Orleans;" "add Jazz music as a soundtrack;" "send me a drink recipe for making a Hurricane;" and "send me directions to the nearest liquor store." The speech phrases are parsed and the words used by the cloud computing platform 102 to assemble a personalized processing pipeline to perform the requested tasks, including adding a classifier for detecting the faces of the user's mom and dad.

In an embodiment, AI is used to determine how the user interacts with the cloud computing platform during a messaging session. For example, if a user speaks the message, "Bob, have you seen Toy Story 4?," the cloud computing platform determines who Bob is and parses "Bob" from the string sent to a message relay server on the cloud computing platform. Similarly, if the message says "Bob, look at this," the platform device sends an image with the message in one step without having to attach the image as separate transaction. The image can be visually confirmed by the user before sending to Bob using projector 1115 and any desired surface. Also, the platform maintains a persistent and personal channel of communication with Bob for a period of time so the name "Bob" does not have to precede each communication during a message session.

Context Data Broker Service

In an embodiment, a context data broker service is provided through cloud computing platform 102. The service allows the users to sell their private raw or processed context data to entities of their choosing. Platform 102 hosts the context data broker service and provides the security protocols needed to protect the privacy of users context data. Platform 102 also facilitates the transactions and the transfer of money or credits between the entities and the users.

Raw and preprocessed context data can be stored using big data storage. The big data storage supports storage and input/output operations on storage with a large number of data files and objects. In an embodiment, the big data storage includes an architecture made up of a redundant and scalable supply of direct attached storage (DAS) pools, scale-out or clustered network attached storage (NAS) or an infrastructure based on object storage format. The storage infrastructure is connected to computing server nodes that enable quick processing and retrieval of big quantities of data. In an embodiment, the big data storage architecture includes native support for big data analytics solutions such as Hadoop™, Cassandra™ and NoSQL™.

In an embodiment, entities that are interested in purchasing raw or processed context data subscribe to the context data broker service through a registration GUI or web page of cloud computing platform 102. Once registered, the entities (e.g., companies, advertising agencies) are allowed to transact directly or indirectly with users through one or more GUIs tailored to facilitate data brokering. In an embodiment, the platform 102 can match the requests of entities for specific types of context data with users that can provide the context data. For example, a clothing company may be interested in all images where their clothing or a competitor's logo was detected. The clothing company can then use the context data to better identify the demographics of their customers. In another example, news outlets or political campaigns may be interested in video footage of newsworthy events to use in a cover story or feature article. Various companies may be interested in the search history or purchase history of users for improved ad targeting or other marketing projects. Various entities may be interested in purchasing context data for use as training data for other object detectors, such as object detectors for self-driving vehicles.

In an embodiment, the user's raw or processed context data is made available in secure formats to protect the user's privacy. Both the users and the entities can have their own online accounts for depositing and withdrawing money resulting from the brokering transactions. In an embodiment, the data broker service collects transaction fees based on a pricing model. Fees can also be obtained through traditional online advertising (e.g., click-throughs on banner ads, etc.)

In an embodiment, individuals can create their own metadata using the wearable multimedia device. For example, a celebrity chef may wear the wearable multimedia device 102 while preparing a meal. Objects in the images are labeled using metadata provided by the chef. A user can obtain access to the metadata from the broker service. When the user attempts to prepare the dish while wearing their own wearable multimedia device 102, objects are detected and metadata (e.g., timing, volume, sequence, scale) to help the user reproduce something provided by the chef is projected onto the user's work surface (e.g., cutting board, counter top, stove, oven, etc.), such as measurements, cooking times and additional tips, etc. For example, a piece of meat is detected on the cutting board and text is projected by the projector 1115 on the cutting board reminding the user to cut the meat against the grain, and also projecting a measurement guide on the meat surface to guide the user in cutting slices with uniform thickness according to the chef's metadata. Laser projection guides can also be used to cut vegetables with uniform thickness (e.g., Julienne, Brunoise). Users can upload their metadata to the cloud service platform, create their own channel and earn revenue by subscriptions and ads, similar to the YouTube® platform.

Figure 11:
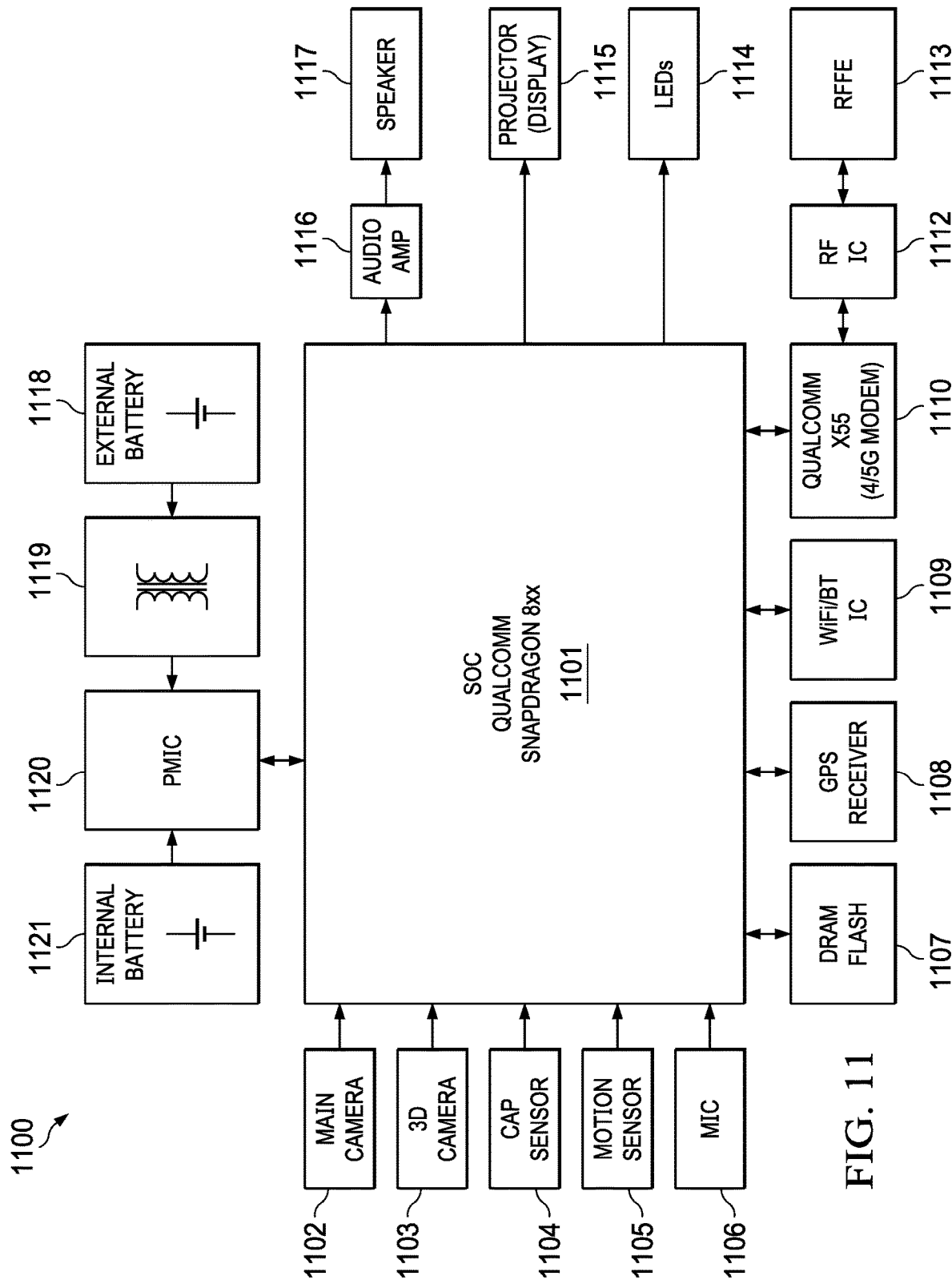
FIG. 11 is system block diagram showing a hardware architecture for the wearable multimedia device, according to an embodiment

FIG. 11 is system block diagram showing a hardware architecture 1100 for the wearable multimedia device, according to an embodiment. Architecture 1100 includes system on chip (SoC) 1101 (e.g., Qualcomm Snapdragon® chip), main camera 1102, 3D camera 1103, capacitive sensor 1104, motion sensor 1105 (e.g., accelerometers, gyros, magnetometers), microphone 1106, memory 1107, global navigation satellite system receiver (e.g., a GPS receiver) 1108, WiFi/Bluetooth chip 1109, wireless transceiver chip 1110 (e.g., 4G, 5G), radio frequency (RF) transceiver chip 1112, RF front end electronics (RFFE) 1113, LEDs 1114, projector 1115 (e.g., laser projection, pico-projector, LCoS, DLP, LCD), audio amplifier 1116, speaker 1117, external battery 1118 (e.g., a battery pack), magnetic inductance circuitry 1119, power management chip (PMIC) 1120 and internal battery 1121. All of these components work together to facilitate the various tasks described herein.

Figure 12:
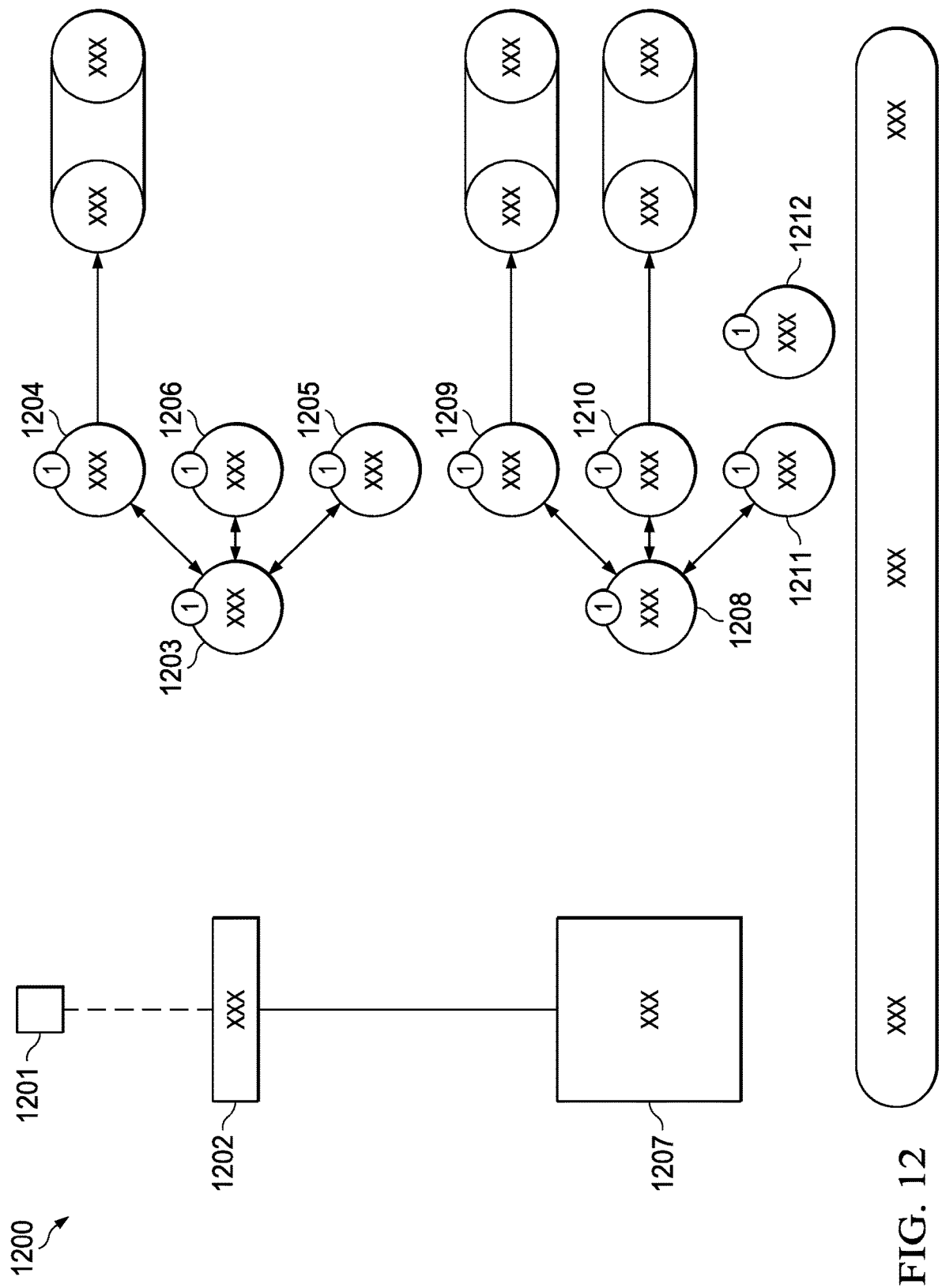
FIG. 12 is a system block diagram showing a processing framework implemented in the cloud computing platform for processing raw or preprocessed context data received from the wearable multimedia device, according to an embodiment.

FIG. 12 is a system block diagram showing an alternative cloud computing platform 1200 for processing raw or preprocessed context data received from wearable multimedia devices, according to an embodiment. Edge server 1201 receives raw or preprocessed context data from wearable multimedia devices 1202 over a wireless communication link. Edge server 1201 provides limited local preprocessing, such as AI or camera video (CV) processing and gesture detection. At edge server 1201, dispatcher 1203 directs the raw or preprocessed context data to state/context detector 1204, first party handler 1205 and/or limited AI resolver 1206 for performing limited AI tasks. State/context detector 1204 uses GNSS data provided by, for example, a GPS receiver or other positioning technology (e.g., Wi-Fi, cellular, visual odometry) of wearable multimedia device 1202 to determine the location where the context data was captured. State/context detector 1204 also uses image and speech technology and AI to analyze image, audio and sensor data (e.g., motion sensor data, biometric data) that is included in the context data to determine user activity, mood and interest.

Edge server 1201 is coupled to regional data center 1207 by fiber and routers. Regional data center 1207 performs full AI and/or CV processing of the preprocessed or raw context data. At regional data center 1207, dispatcher 1208 directs the raw or preprocessed context data to state/context detector 1209, full AI resolver 1210, first handler 1211 and/or second handler 1212. State/context detector 1209 uses GNSS data provided by, for example, the GPS receiver or other positioning technology (e.g., Wi-Fi, cellular, visual odometry) of wearable multimedia device 1202 to determine the location where the context data was captured. State/context detector 1209 also uses image and speech recognition technology and AI to analyze image, audio and sensor data (e.g., motion sensor data, biometric data) that is included in the context data to determine user activity, mood and interest.

FIG. 13 illustrates software components 1300 for the wearable multimedia device, according to an embodiment. For example, software components include daemons 1301 for AI and CV, gesture recognition, messaging, media capture, server connectivity and accessory connectivity. Software components further include libraries 1302 for graphics processing units (GPU), machine learning (ML), camera video (CV) and network services. Software components includes an operating system 1303, such as Android® Native Development Kit (NDK,) including hardware abstractions and a Linux kernel. Other software components 1304 include components for power management, connectivity, security+encryption and software updates.

Figure 14A:
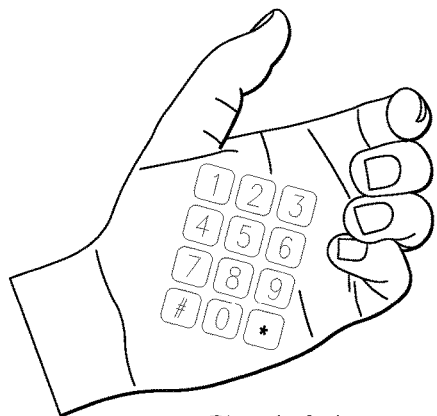
FIGS. 14A-14D illustrate the use of a projector of the wearable multimedia device to project various types of information on the palm of a user's hand, according to an embodiment.
Figure 14B:
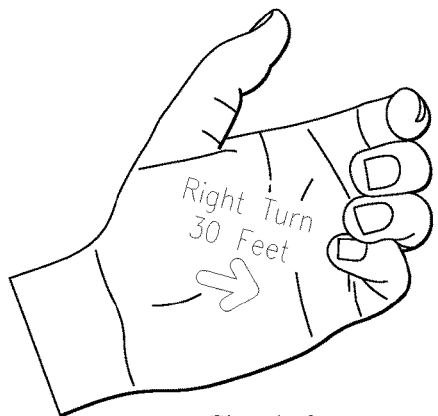
Figure 14C:
Figure 14D:
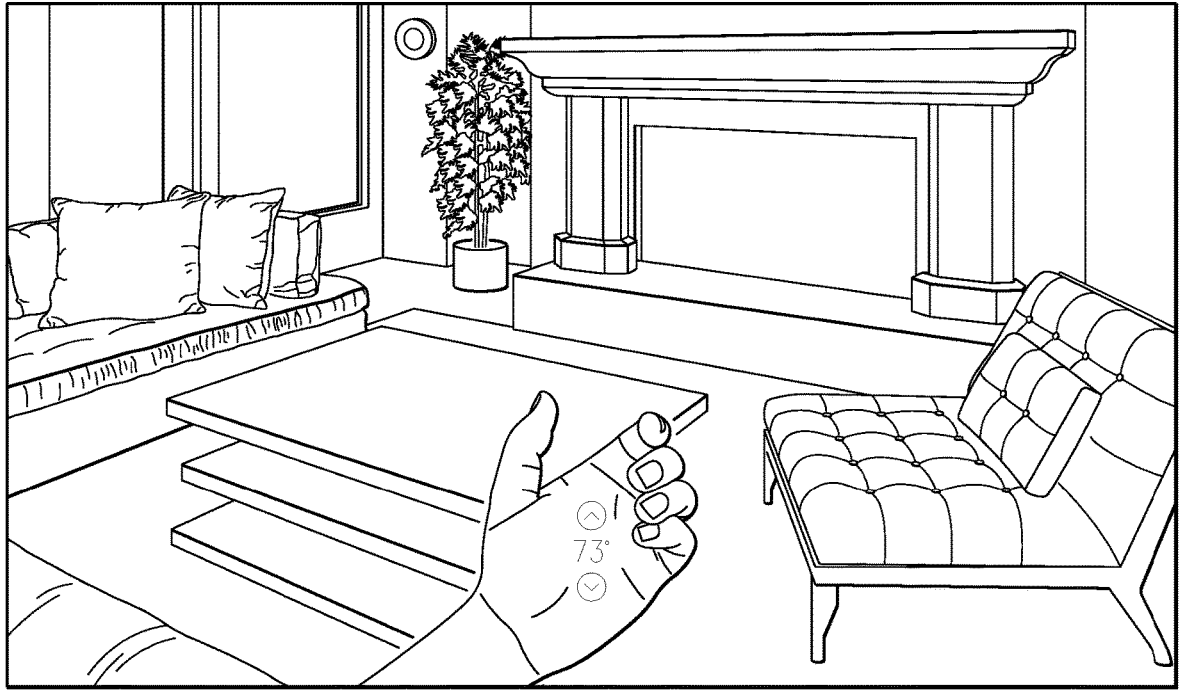

FIGS. 14A-14D illustrate the use of a projector 1115 of the wearable multimedia device to project various types of information projected by the projector 1115 on the palm of a user's hand, according to an embodiment. In particular, FIG. 14A shows a laser projection of a numeric pad on the palm of a user's hand for use in dialing phone numbers and other tasks requiring number input. 3D camera 1103 (depth sensor) is used to determine the position of the user's finger on the numeric pad. The user can interact with the numeric pad using, such as dialing a telephone number. FIG. 14B shows turn-by-turn directions projected on the palm of the user's hand. FIG. 14C shows a clock projected on the palm of the user's hand. FIG. 14D shows a temperature reading on the palm of the user's hand. Various one or two finger gestures (e.g., tap, long press, swipe pinch/de-pinch) can be detected by 3D camera 1103 resulting in different actions being triggered on the wearable multimedia device.

Although FIGS. 14A-14D show laser projections on a user's palm, any projection surface can be used, including but not limited to: walls, floors, ceilings, curtains, clothing, projection screens, table/desk/counter tops, appliances (e.g., stoves, washing machine/dryer) and apparatuses (e.g., car engines, electronic circuit boards, cutting boards).

Figure 15A:
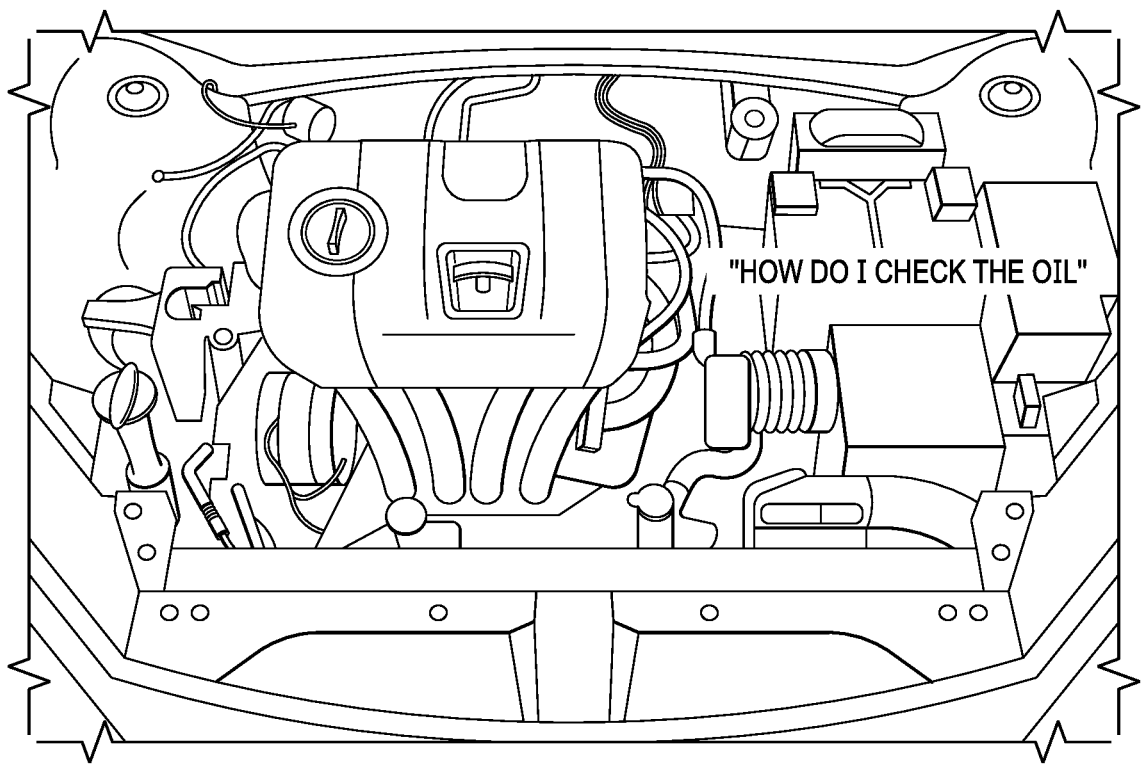
FIGS. 15A and 15B illustrates an application of the projector, where information is projected on an automobile engine to assist a user in checking their engine oil, according to an embodiment.
Figure 15B:
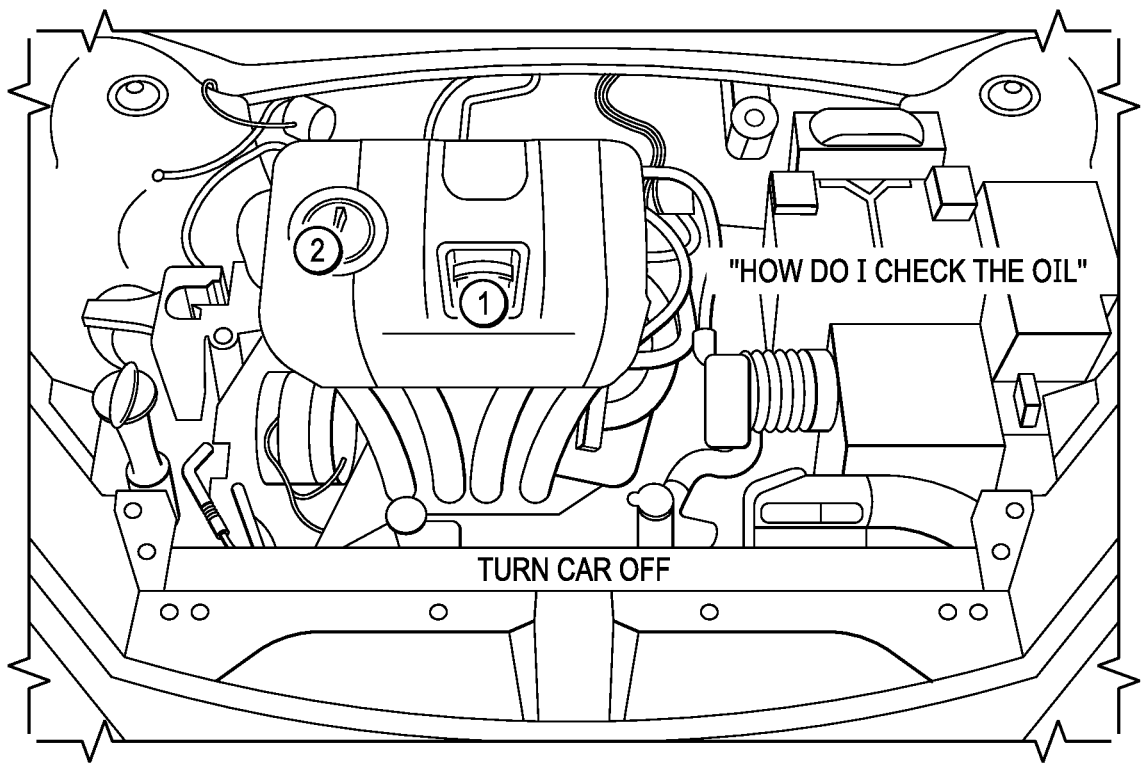

FIGS. 15A and 15B illustrate an application of the projector 1115, where information to assist a user in checking their engine oil is projected onto an automobile engine, according to an embodiment. FIGS. 15A and 15B show before and after images of the image. The user utters the speech: "How do I check the oil?" In this example, the speech is received by microphone 1106 and main camera 1102 and/or 3D camera 1103 of wearable multimedia device 1202 captures an image of the engine. The image and speech are compressed and sent to edge server 1201. Edge server 1201 sends the image and audio to regional data center 1207. At regional data center 1207, the image and audio are decompressed and one or more classifiers are used to detect and label the location of the oil dipstick and the oil filler cap in the image. The labels and their image coordinates are sent back to wearable multimedia device 1202. Projector 1115 projects the labels onto the car engine based on the image coordinates.

Figure 16:
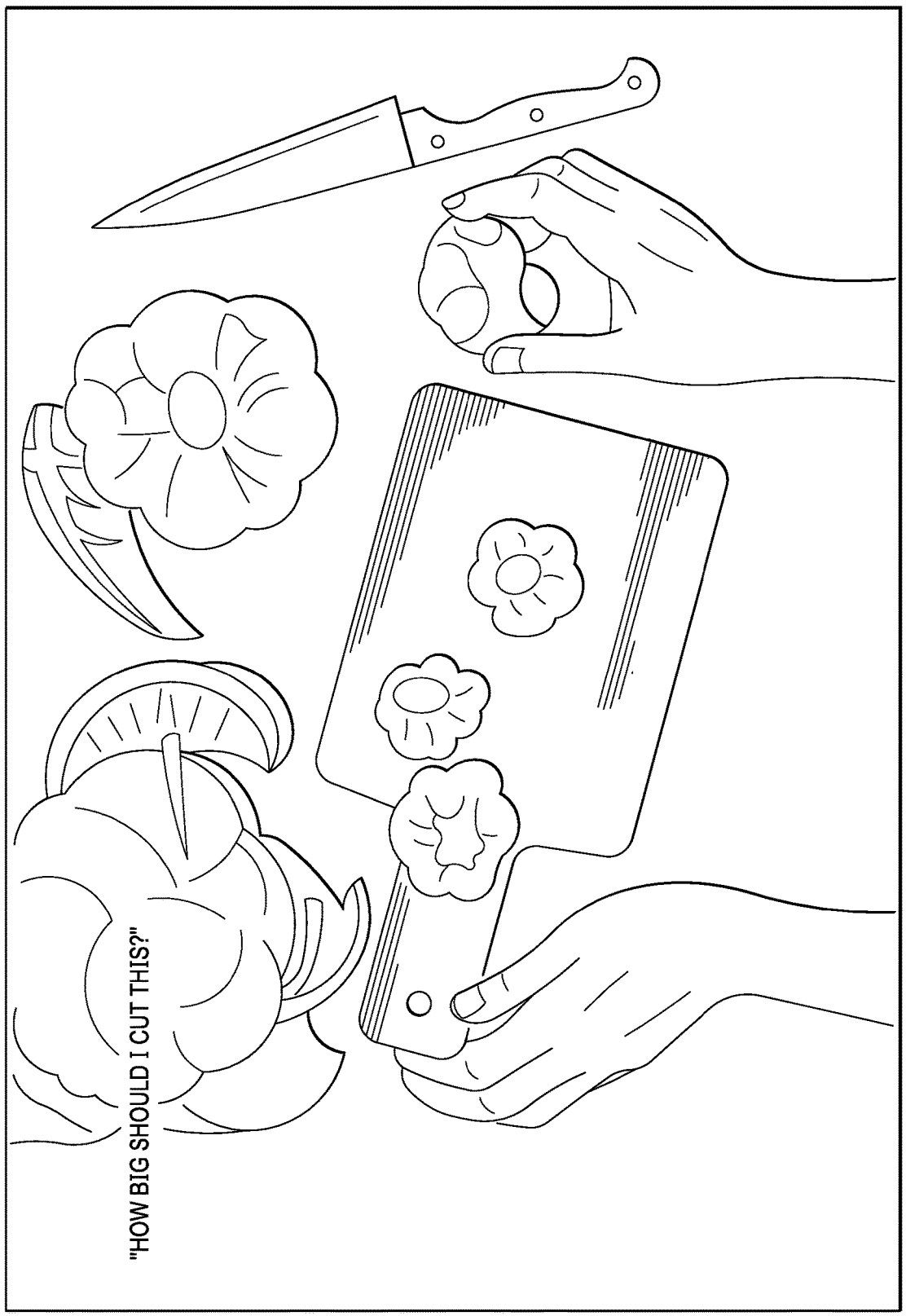
FIG. 16 illustrates an application of the projector, where information for assisting a home cook in cutting vegetables is projected onto a cutting board, according to an embodiment.

FIG. 16 illustrates an application of the projector, where information for assisting a home cook in cutting vegetables is projected onto a cutting board, according to an embodiment. The user utters the speech: "How big should I cut this?" In this example, the speech is received by microphone 1106 and main camera 1102 and/or 3D camera 1103 of wearable multimedia device 1202 captures an image of the cutting board and vegetable. The image and speech are compressed and sent to edge server 1201. Edge server 1201 sends the image and audio to regional data center 1207. At regional data center 1207, the image and audio are decompressed and one or more classifiers are used to detect the vegetable type (e.g., cauliflower), its size and its location in the image. Based on the image information and the audio, cutting instructions (e.g., obtained from a database or other data source) and image coordinates are determined and sent back to wearable multimedia device 1202. Projector 1115 projects a size template onto the cutting board surrounding the vegetable using the information and image coordinates.

Figure 17:
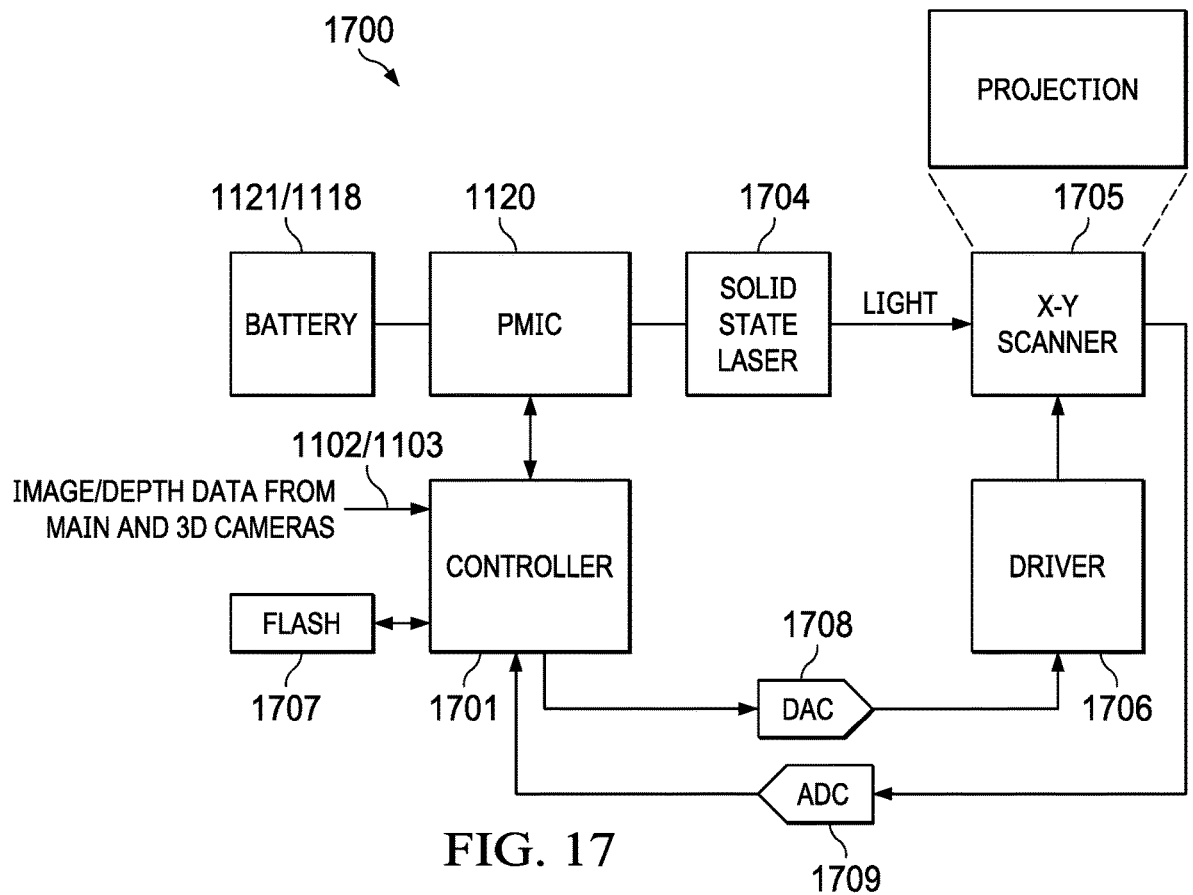
FIG. 17 is a system block diagram of a projector architecture, according to an embodiment.

FIG. 17 is a system block diagram of projector architecture 1700, according to an embodiment. Projector 1115 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, projector 1700 is a scanning pico-projector that includes controller 1701, battery 1118/1121, power management chip (PMIC) 1120, solid state laser 1704, X-Y scanner 1705, driver 1706, memory 1707, digital-to-analog converter (DAC) 1708 and analog-to-digital converter (ADC) 1709.

Controller 1701 provides control signals to X-Y scanner 1705. X-Y scanner 1705 uses moveable mirrors to steer the laser beam generated by solid state laser 1704 in two dimensions in response to the control signals. X-Y scanner 1705 includes one or more micro-electromechanical (MEMS) micromirrors that have controllable tilt angles in one or two dimensions. Driver 1706 includes a power amplifier and other electronic circuitry (e.g., filters, switches) to provide the control signals (e.g., voltages or currents) to X-Y scanner 1705. Memory 1707 stores various data used by the projector including laser patterns for text and images to be projected. DAC 1708 and ADC 1709 provide data conversion between digital and analog domains. PMIC 1120 manages the power and duty cycle of solid state laser 1704, including turning on and shutting of solid state laser 1704 and adjusting the amount of power supplied to solid state laser 1704. Solid state laser 1704 is, for example, a vertical-cavity surface-emitting laser (VCSEL).

In an embodiment, controller 1701 uses image data from main camera 1102 and depth data from 3D camera 1103 to recognize and track user hand and/or finger positions on the laser projection, such that user input is received by the wearable multimedia device 102 using the laser projection as an input interface.

In another embodiment, projector 1115 uses a vector-graphic projection display and low-powered fixed MEMS micromirrors to conserve power. Because projector 1115 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.)

In other embodiments, Liquid Crystal on Silicon (LCoS or LCOS), Digital Light Processing (DLP) or Liquid Chrystal Display (LCD) digital projection technology can be used instead of a pico-projector.

Figure 18:
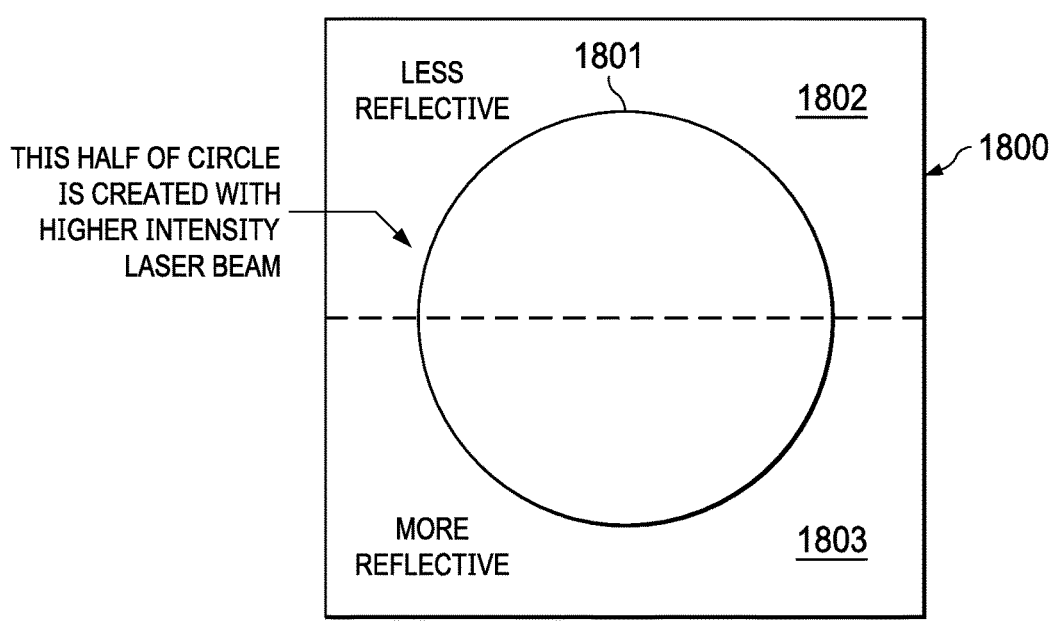
FIG. 18 illustrates the adjustment of laser parameters based on different surface geometry or material, according to an embodiment.

FIG. 18 illustrates the adjustment of laser parameters based on the amount of light reflected by the surface. To ensure that the projection is clean and easy to read on a large variety of surfaces, data from 3D camera 1103 is used to adjust one or more parameters of projector 1115 based on the surface reflections. In an embodiment, reflections of the laser beam from the surface are used to automatically adjust the intensity of the laser beam to compensate for the different indexes of refraction to create a projection with uniform brightness. The intensity can be adjusted by, for example, adjusting the power supplied to solid state laser 1115. The amount of adjustment can be computed by controller 1701 based on the energy level of the reflected laser beam.

In the example shown, circle pattern 1800 is projected on surface 1801, which includes region 1802 having a first surface reflection and region 1803 having a second surface reflection that is different than the first surface reflection. The difference in surface reflections (e.g., due to different refraction indexes) in regions 1802, 1803 results in circle pattern 1800 being less bright in region 1802 than region 1803. To generate circle pattern 1800 with uniform intensity, solid state laser 1704 is commanded by controller 1701 (through PMIC 1120) to increase/decrease the power supplied to solid state laser 1704 to increase the intensity of the laser beam when scanning in region 1802. The result is a circle pattern 1800 with uniform brightness. In cases where the surface geometry of region 1802 and 1803 are different, one or more lens can be used to adjust the size of the projected text or image on the surface. For example, region 1802 can be curved while region 1803 can be flat. In this scenario, the size of text or images in region 1802 can be adjusted to compensate for the curvature of the surface in region 1802.

In an embodiment, laser projections can be automatically or manually requested by user air gestures (e.g., finger pointing to identify objects of interest, swiping to indicate operations on data, holding up fingers to indicate counts, thumbs up or down to indicate preference, etc.), and projected to any surface or object in the environment. For example, a user can point to thermostat in their home and temperature data is projected on their palm or other surface. The camera and depth sensor detect where the user is pointing, identify the object as a thermostat, run a thermostat application on the cloud computing platform, and stream the application data to the wearable multimedia device where it is displayed on a surface (e.g., the user's palm, wall, table). In another example, if the user is standing in front of smart lock on the front door of their home, and all locks in their home are linked, controls for the smart lock are projected on the surface of the smart lock or the door to access that lock or other locks in their home.

In an embodiment, images taken by the camera and its large field-of-view (FOV) can be presented to a user in "contact sheets" using an AI-powered virtual photographer running on the cloud computing platform. For example, various presentations of the image are created with different crops and treatments using machine learning (e.g., neural networks) trained with images/metadata created by expert photographers. With this feature every image taken may have multiple "looks" which involve multiple image processing operations on the original image including operations informed by sensor data (e.g., depth, ambient light, accelerometer, gyro).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A body-worn apparatus comprising:
a camera;
a depth sensor;
a laser projection system;
one or more processors;

memory storing instructions that when executed by the one or more processors, cause the one or more processors to perform operations comprising:
capturing, using the camera, a first set of digital images;
identifying a real-world object in the first set of digital images;
capturing, using the depth sensor, first depth data;
identifying, in the first set of digital images and the first depth data, a first gesture of a user wearing the apparatus,
wherein identifying the real-world object and the first gesture includes:
processing the first set of digital images through an object detection framework that uses a complex polygon to identify a hotspot region in the first set of images, wherein the hotspot region is smaller than the entire image and captures the first gesture and the real-world object while excluding all other objects in the first set of images;
sending, to a cloud computing platform, the hotspot region;
receiving, from the cloud computing platform, information related to the real-world object; and
projecting, with the laser projection system, at least some of the information on a surface.

2. The apparatus of claim 1, wherein the information includes a text label for the real-world object.

3. The apparatus of claim 1, wherein the information includes instructions for performing an action on the real-world object.

4. The apparatus of claim 1, wherein the information includes a command for controlling the real-world object.

5. The apparatus of claim 1, wherein the operations further comprise:
obtaining, using the depth sensor, a second gesture associated with the laser projection;
determining user input based on the second gesture; and
initiating one or more actions in accordance with the user input.

6. The apparatus of claim 5, wherein the operations further comprise:
masking the laser projection to prevent projecting the data on a hand of the user making the second gesture.

7. The apparatus of claim 1, the operations further comprising:
capturing, using the camera, reflections of the laser projection from the surface;
automatically adjusting an intensity of the laser projection to compensate for different indexes of refraction so that the laser projection has a uniform brightness.

8. The apparatus of claim 1, further comprising:
a magnetic attachment mechanism configured to magnetically couple to a battery pack through a user's clothing, the magnetic attachment mechanism further configured to receive inductive charging from the battery back.

9. A method comprising:
capturing, using a camera, a set of digital images;
capturing, using a depth sensor of a body-worn apparatus, depth data;
identifying a real-world object in the set of digital images;
identifying, in the set of digital images and depth data, a first gesture, the first gesture made by a user wearing the apparatus;
wherein identifying the real-world object and the first gesture includes:
processing the set of digital images through an object detection framework that uses a complex polygon to identify a hotspot region in the set of images, wherein the hotspot region is less than the entire image and captures the first gesture and the real-world object while excluding all other objects in the set of images;
sending, to a cloud computing platform, the hotspot region;
receiving, from the cloud computing platform, information related to the real-world object; and
projecting, with the laser projection system, at least some of the information on a surface.

10. The method of claim 9, further comprising:
obtaining, using the depth sensor, a second gesture by the user, the second gesture associated with the laser projection;
determining user input based on the second gesture; and
initiating one or more actions in accordance with the user input.

11. The method of claim 10, wherein the one or more actions include controlling the real-world object.

12. The method of claim 11, wherein the controllable real-world object is a television or computer screen, and the one or more actions include swiping through one or more images displayed by the television or computer screen.

13. The method of claim 11, wherein the controllable real-world object is a thermostat and the one or more actions including changing a temperature setting of the thermostat.

14. The method of claim 10, further comprising:
masking the laser projection to prevent projecting the data on a hand of the user making the second gesture.

15. The method of claim 9, wherein the laser projection includes a size template for measuring the real-world object.

16. The method of claim 9, further comprising:
receiving audio input from the user; and
associating the first gesture and audio input with a request or command for controlling the real-world object.

17. The method of claim 9, where the surface is a palm of the user's hand.

* * * * *